UNITED STATES PATENT OFFICE.

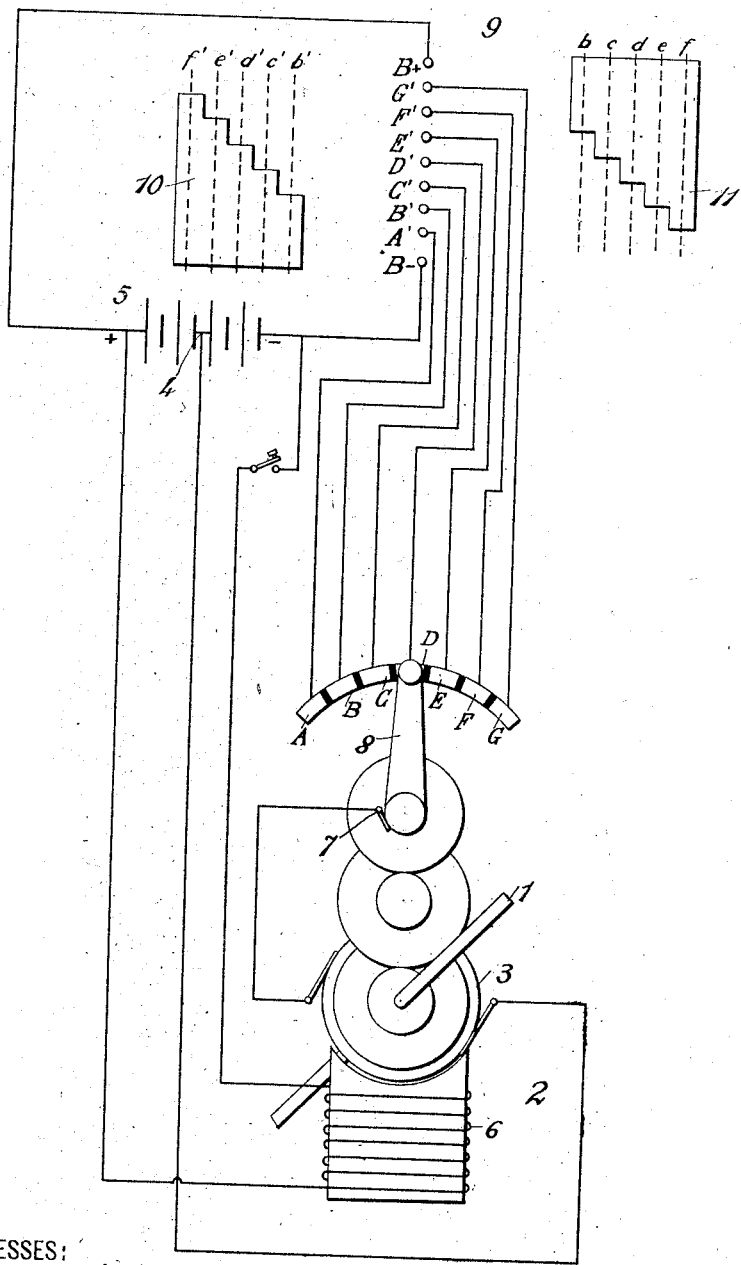

FREDERICK DARLINGTON AND OTTO S. SCHAIRER, OF PITTSBURG, PENNSYLVANIA, ASSIGNORS TO WESTINGHOUSE ELECTRIC & MANUFACTURING COMPANY, A CORPORATION OF PENNSYLVANIA.

SYSTEM OF CONTROL.

No. 873,351.

Specification of Letters Patent.

Patented Dec. 10, 1907.

Application filed March 3, 1906. Serial No. 304,018.

*To all whom it may concern:*

Be it known that we, FREDERICK DARLINGTON and OTTO S. SCHAIRER, citizens of the United States, and residents of Pittsburg, in the county of Allegheny and State of Pennsylvania, have invented certain new and useful Improvements in Systems of Control, of which the following is a specification.

Our invention relates to systems of control for electric motors and it has for its object to provide novel and improved means whereby the movement of one or more electric motors may be caused to correspond in direction and to be accurately proportional in extent to the movements of a master controller.

The single figure of the accompanying drawing illustrates, diagrammatically, a system embodying our invention.

A shaft 1 that is operatively connected to any suitable device (not shown), the movements of which it is desired to govern accurately, is adapted to be operated by an electric motor 2, one terminal of the armature 3 of which is connected to an intermediate or neutral point 4 of a suitable source of energy such as a battery 5. The field magnet winding 6 of the motor is connected between the terminals or other points of the battery, or it may be energized from any other suitable source. The other terminal of the armature 1 is connected by means of a brush 7 to a contact arm 8 that is adapted to be moved by the motor over a set of stationary conducting segments A, B, C, D, E, F and G, that are respectively connected to corresponding stationary contact terminals A', B', C', D', E', F' and G' of a manually operated controller 9. The controller 9 comprises, further, contact terminals B+ and B—, that are respectively connected to the positive and negative terminals of the battery, and two conducting segments 10 and 11 that are adapted to engage the stationary contact terminals thereof in the positions indicated by the lines *b*, *c*, *d* and *f* and *b'*, *c'*, *d'* and *f'*.

If, when the switch arm 8 engages the conducting segment D, it is desired to cause the device that is operated by the motor to occupy a position such that the arm 8 will engage conducting segment F, the conducting segment 10 of the controller 9 should be moved to the position indicated by the line *f'*, whereupon a circuit will be established from the neutral point 4 of the battery 5, through the devices bearing reference characters 3, 7, 8, D, D', 10 and B—. The motor 3 will then operate so as to move the arm 8 over the conducting segment E, when the circuit will remain established as before, except that it will traverse from the switch arm 8 to the conducting segment 10 by way of stationary contact terminals E and E'. The motor will continue to operate until the switch arm 8 moves from the conducting segment F to the adjacent segment G, whereupon the motor circuit will be interrupted. If the controller had been moved only to position *e'* the arm would have been operated until it had passed over the segment E to the segment F, and it might then have been caused to move from the segment F to segment G by moving the controller to the position *f'*.

If, when the switch arm 8 engages the segment G, it is desired to operate the member controlled by the shaft 3 in such direction as to cause the switch arm 8 to move to the left, the conducting segment 11 of the controller 9 should be moved to the left to the position corresponding to the extent of movement that it is desired to impart to the controlled member. A circuit is then established by way of the devices indicated by the reference characters 5, B+, 11, G', G, 8, 7, 3 and 4. It will thus be observed that the motor armature is traversed by the current in a reverse direction from that in which it was traversed when the conducting segment 10 engaged the corresponding contact terminals, and, consequently, the direction of rotation of the motor is reversed. If the conducting segment 11 is moved to the position *f* the motor will continue to operate until the switch arm 8 engages stationary segment A, whereupon the motor circuit will be interrupted. Thus it is seen that the direction of rotation of the motor 2 is dependent upon the direction of movement of the controller 9 and that the number of rotations thereof or the extent of movement of the member operated thereby, is accurately proportional to the extent of movement of the controller. The battery 5 may obviously be replaced by a transformer, a motor generator or any other source of energy having a neutral point. By the employment of a source of energy having a neutral point and the arrangement of the circuits herein shown and described a separate reversing switch for the motor is unnecessary and consequently the system is less complex than others heretofore provided. Another advantage is that a constant potential is supplied to the motor. The main switch may, if desired, be replaced by a plurality of individually actuated switches that are suitably interlocked, or the direction and extent of rotation of the motor may be governed in any other suitable manner.

The structural details and arrangements of the parts may be varied in other respects without modifying the mode of operation of the invention or departing from its spirit and we desire that all such modifications be included within its scope.

We claim as our invention:

1. The combination with a source of electrical energy and a motor having one terminal connected to a neutral or intermediate point thereof, of a set of conducting segments, means operated by the motor whereby its other terminal may be connected to the conducting segments, and means whereby the conducting segments may be connected to the one terminal or the other of the source.

2. The combination with a source of electrical energy and a motor having one terminal connected to a neutral or intermediate point thereof, of a set of conducting segments, means operated by the motor whereby its other terminal may be connected to the conducting segments, and means whereby all but one or a less number of the conducting segments may be connected simultaneously to the one terminal or the other of the source.

3. The combination with a source of electrical energy and a motor having one terminal connected to a neutral or intermediate point thereof, of a set of conducting segments, means operated by the motor whereby its other terminal may be connected to the conducting segments, and means whereby the end segments of the set may be connected, respectively, to the terminals of the source and whereby the intermediate segments may be connected to the one terminal or the other of the source.

In testimony whereof, we have hereunto subscribed our names this 21st day of February 1906.

FREDERICK DARLINGTON.
OTTO S. SCHAIRER.

Witnesses:
WESLEY G. CARR,
BIRNEY HINES.